Patented June 2, 1942

2,285,314

UNITED STATES PATENT OFFICE 2,285,314

MANUFACTURE OF CATALYSTS

Charles L. Thomas and Jacob Elston Ahlberg, Chicago, Ill., assignors to Universal Oil Products Company, Chicago, Ill., a corporation of Delaware No Drawing. Application October 22, 1938, Serial No. 236,549

8 Claims. (Cl. 252—250)

This is a continuation-in-part of our pending application No. 171,986 filed October 30, 1937.

This invention relates more particularly to the manufacture of catalysts suitable for accelerating reactions among hydrocarbons.

More specifically it has reference to a method for manufacturing refractory catalytic materials which are particularly effective in selectively promoting the formation of gasoline boiling range liquids from relatively heavy petroleum fractions.

The art of pyrolytically cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, it is largely empirical. A considerable number of the catalysts tried out in cracking have a tendency to accelerate reactions leading to the formation of gas rather than of gasoline, this being particularly evidenced by reduced metal catalysts, such as nickel or iron, and many of such catalysts are sensitive to sulfur poisoning and are quickly coated with carbonaceous materials which render them practically inert. This deposition of carbonaceous materials is frequently related to the type of decomposition reactions selectively fostered by the catalyst.

The present invention is concerned with the manufacture of catalytic materials which are specially adapted to accelerate the cracking of heavy fractions of petroleum and other hydrocarbonaceous materials to increase the rate of production of high antiknock gasoline boiling range fractions and gaseous by-products which contain unusually high percentages of readily polymerizable olefins which are a potential source of further gasoline yields. The preferred catalysts are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises the manufacture of catalysts suitable for use in hydrocarbon conversion reactions, more particularly the conversion of hydrocarbon fractions containing substantially no gasoline into substantial yields of gasoline of high antiknock value and gases containing relatively high percentages of readily polymerizable olefins by preparing in the primary step a precipitated hydrated silica gel, treating and washing said silica gel with a reactant and water to effect substantially complete removal of alkali metal ions, adding a precipitated alumina to the purified precipitated silica, then drying the composite catalytic material to remove a major portion of the water content, forming into particles of definite size and calcining the purified catalytic material.

We have found that alumina-silica catalysts, which may be prepared by the several alternate methods described in more detail in the following paragraphs, are rendered much more stable over long periods of use, and also more active and selective in accelerating gasoline-forming reactions in cracking, when the originally precipitated hydrated silica which forms the primary material upon which the precipitated alumina is subsequently disposed, is substantially freed from alkali metal ions which in the more general methods of preparation will be sodium ions inasmuch as the various sodium silicates comprise one of the more readily available raw materials for the manufacture of this type of catalyst. The purification treatment which constitutes one of the main features of our invention is described in detail in later paragraphs. The subsequent deposition of alumina upon the purified precipitated silica gel may be varied somewhat and the following is a summary of the alternative modes of operation which may be employed:

1. The purified precipitated hydrated silica gel may be suspended in a solution of an aluminum salt and alumina deposited upon the suspended silica by the addition of volatile basic precipitants, such as ammonium hydroxide, for example, or ammonium carbonate, ammonium hydrosulfide, ammonium sulfide, or other volatile basic precipitants generally may be employed.

2. The purified precipitated hydrated silica gel may be mixed while in the wet condition with a hydrated alumina prepared, for example, by addition of volatile basic precipitants to an aluminum salt solution, or prepared by precipitation from a sodium aluminate solution when the precipitated alumina may be also treated and washed by the methods hereinafter described for the purification of the precipitated silica gel.

3. The purified precipitated silica gel may be added to a solution of an aluminum salt and alumina precipitated by hydrolysis, preferably by heating, or the purified silica gel may be mixed with a suitable amount of an aluminum salt, for example, and heated whereby alumina will be deposited upon the decomposition of the aluminum salt.

It can be seen from the above that various methods of admixing hydrated silica and hydrated alumina substantially free from alkali metal ions may be employed within the scope of the present invention, although obviously the character and efficiency of the ultimately prepared alumina-silica catalysts will vary more or less with the exact conditions of precipitation and/or mixing, purification treatment, and the ratio of alumina to silica. For example, one preparation may furnish catalysts best suited for use in the cracking of heavy hydrocarbon fractions, another may be better adapted for use in reforming hydrocarbons substantially within the gasoline boiling point range, while still another preparation may be better adapted for other hydrocarbon reactions.

In the catalysts thus prepared the ratio of silica to alumina by weight may range from 1 to 1 to 10 to 1 or greater ratios may be used, active catalysts having been prepared in which the ratio is as high as 50 to 1 so that in effect the alumina may be considered to act as a promoter of the catalytic activity of the silica. It is to be recognized that very little is known positively concerning the mechanism of promoter action in catalysis and no attempt will be made herein to offer any definite reason for the observed effect of the addition of varying amounts of alumina to silica. There may be a joint promoter effect or it may be that the alumina is the more active catalyst and is extensively dispersed in and on the silica in order to present a large surface.

An important feature of our invention resides in the fact that catalysts of greatly increased stability and efficiency in cracking reactions are produced when there is substantially complete exclusion of alkali metal ions from the hydrated alumina-silica masses prior to their drying and calcining to prepare them for service. In the present invention a precipitated hydrated silica gel substantially free from alkali metal ions is used as the primary material or base for the subsequent deposition of hydrated alumina. Silica gel free from alkali metal ions may be prepared by the hydrolysis of silicon tetra-chloride, for example, but in the more usual method the hydrated silica gel will be prepared by the acidification of alkali metal silicates, whereby alkali metal ions are unavoidably incorporated into the silica gel which are removed as one feature in the process of our invention. It is not positively known whether the alkali metal compounds, such as those of sodium, are present in chemical combination or in an adsorbed state, but it has been definitely determined that their exclusion or removal is necessary if catalysts of superior activity and stability are to be obtained. It may be considered that the presence of these alkali metal ions may cause a sintering or fusion of the surfaces of the primary composites of the catalytic material at elevated temperatures so that the porosity of the catalyst particles is reduced or altered with a corresponding reduction in effective surface considering the catalytic effects to be due at least in part to surface action. However, such concepts are principally speculative in view of the difficulty of obtaining direct confirmatory evidence.

Several alternative purification methods are applicable to primary hydrated silica gels prepared by the acidification of alkali metal silicate solutions to insure the substantially complete absence of sodium or other alkali metal ions. One method consists in treating and washing the precipitated silica gel with acidic solutions to extract alkali metal impurities incorporated into the silica gel during its preparation by the formation of corresponding alkali metal salts. Thus a precipitated silica gel may be first washed with water to remove a major portion of the soluble impurities and subsequently treated with a mineral acid, for example, such as hydrochloric acid and water to remove the alkali metal ions. As an alternative purification method the primary precipitated hydrated silica may be treated with ammonium compounds or salts, such as ammonium chloride in solution or other halides, the sulfate, the nitrate, the phosphates, or the acetate, so that alkali metal ions will not be substantially present in the primary gel when it has been suitably washed. Whether the alkali metal ions are present in the hydrated silica gel in a chemically combined or adsorbed condition, the alkali metal ions may be replaced by the ammonium ions which will be later expelled from combination or adsorption in subsequent treatment at elevated temperature.

Another alternative method for removing alkali metal ions from the precipitated hydrated silica gel consists in treating with salts of multivalent metals which may replace the sodium or other alkali metals in the manner similar to that described in the case of ammonium compounds. For example, a primary gel having large amounts of alkali metal compounds present may be treated with a solution of salts of multivalent metals, more particularly aluminum, in which the metal forms the positive ion of the salt being used. In this mode of operation the multivalent metal used to replace the alkali metals ions is introduced into the catalytic material and is not removed at elevated temperatures as is the ammonium above described. Whatsoever the purification method used, purified hydrated primary gels have been prepared by all the methods above described and substantially alkali metal-free alumina has been added with further processing according to the present invention to form catalysts suitable for hydrocarbon reactions.

The weight of evidence at hand on the mechanism leading to the replacement of alkali metals in the primary hydrated gel indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from the base exchange that occurs in the case of zeolites.

After the alumina has been mixed or deposited upon the purified hydrated silica gel and water washed, if desired, it may be recovered as a filter cake and dried at a temperature of the order of 240–300° F., more or less, after which it may be pressed and sized to recover particles of a convenient average size or formed into desired shapes by compression methods. It has been found that after the usual drying treatment the material usually has a total water content of approximately 15 per cent which appears to correspond to the best workability of the material. By calcining the particles at temperatures of the order of 850–1000° F., or higher, maximum activity of the catalyst is obtained and a further dehydration occurs so that, for example, after a period of heating at 900° F. the water content as determined by analysis is of the order of 2 to 3 per cent which does not vary appreciably either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures as high as 1400 to 1600° F. without material loss of catalytic activity.

According to the present process catalysts prepared by the general procedure described in the preceding paragraphs are utilized to advantage in cracking reactions when employed as filling material in tubes or chambers in the form of small pellets or granules. In the examples given below, wherein hydrocarbon fractions readily vaporizable at moderate temperatures without excessive decomposition are employed, the average particle size is within the range of 6 to 10 mesh, which may apply either to small pellets of uniform size and short cylindrical shape or to particles of irregular size and shape produced by the grinding and sizing of the partially dehydrated materials.

The general procedure in cracking involves contacting the heated hydrocarbonaceous material with the catalyst and the subsequent fractionation steps involving separation of residuum and the further splitting up of the products into fixed gases, fractions of gasoline boiling range and heavier recycle stocks, may obviously be followed in the case of the catalysts comprised within the scope of the invention. In using these catalysts moderate temperatures, relatively low pressures and high through-puts are to be expected in comparison with the strictly thermal cracking processes in use at the present time.

The following examples of preparation of the types of catalysts peculiar to the present invention are given to indicate their novelty and utility although not for the purpose of limiting the invention in exact agreement with the data introduced.

Example I

A cracking catalyst prepared according to the present invention consists of approximately 85% $SiO_2$ and 15% $Al_2O_3$ on a dry basis separately prepared and mixed. The general procedure observed in preparing this catalyst was to precipitate a silica gel and wash free from alkali metal ions with aluminum chloride solution and mix with alumina precipitated from an aluminum chloride solution by the use of ammonium hydroxide.

Fifty-five pounds of commercial waterglass was dissolved in 40 gallons of water and approximately 7½ gallons of 2.5 molar hydrochloric acid was added gradually while agitating. The precipitation was thus carried out in an alkaline medium until finally when all the acid had been added the liquor became acidic to litmus. The precipitated gel was then filtered and washed twice using approximately 30 gallons of water per batch. Subsequent washing was with 15 gallons of water containing 2.7 pounds of $AlCl_3.6H_2O$. 5.33 pounds of $AlCl_3.6H_2O$ was then dissolved in 15 gallons of water. The purified silica above prepared was suspended in this aluminum chloride solution and 0.66 gallon of ammonium hydroxide was slowly added while agitating until alkaline to litmus. The precipitated mass was then filtered and washed four times with 20–35 gallon portions of water. This filter cake was dried and a portion of it prepared into 6–10 mesh granules for a test and finally calcined at approximately 932° F.

The following results were obtained when processing a 37.3 A. P. I. gravity gas-oil in a once-through operation:

*Cracking data and results*

| | Run 1 | Run 2 |
|---|---|---|
| Temperature _____°F__ | 932 | 932 |
| Gasoline, 400° F., E. P.: | | |
|   Volume, per cent_____ | 26.4 | 30.7 |
|   Weight, per cent_____ | 23.1 | 26.8 |
|   A. P. I. gravity_____60° F__ | 61.2 | 62.4 |
|   Octane number, motor method_____ | 80.7 | 80.3 |
| Gases boiling range (below +10° C.): | | |
|   Weight per cent (total)_____ | 9.9 | 8.2 |
|   Molecular weight_____ | 42.4 | 43.3 |
|   Propene and butenes, weight per cent of charge | 6.4 | 4.8 |
| Gas-oil recovered (recycle stock): | | |
|   Volume per cent_____ | 65.3 | 65.5 |
|   Weight per cent_____ | 65.4 | 65.6 |
|   A. P. I. gravity_____60° F__ | 37.1 | 37.2 |

Example II

In this example a purified precipitated silica gel was added to a slurry of hydrated alumina precipitated from an aluminum chloride solution by the addition of ammonia. The details of the procedure are given below.

390 cc. of concentrated hydrochloric acid in 1815 cc. of water was added to 568.4 grams of sodium silicate ($Na_2SiO_3.9H_2O$) in 3 liters of water. The precipitate which formed was then separated by filtration. The filter cake was then slurried in 2½ liters of water and filtered, this washing treatment being repeated several times. The filter cake was subsequently slurried in 2½ liters of water containing 50 cc. of 2½ molar hydrochloric acid and then filtered, this treatment being again repeated. Water washing treatment was subsequently used and repeated about five times when the wash water was practically free from alkali metal salts. The purified silica was then slurried in 3 liters of water to which was added a suspension of alumina precipitated by the addition of .50 equivalent of ammonia in 500 cc. of water to 40.24 grams of aluminum chloride hexahydrate dissolved in 500 cc. of water. The mixture was filtered and the filter cake slurried in 2½ liters of water and filtered, this washing treatment being repeated 4 times when the wash water was chloride-free. The filter cake was then dried at approximately 300° F. and then presesd and sized into 6–10 mesh granules, the granules being finally calcined at approximately 932° F.

Using granules of the above catalyst in a catalyst chamber a Pennsylvania gas-oil was vaporized and preheated to a temperature of 932° F. and passed through the granular catalyst bed at a liquid space velocity per hour of approximately 4. In a single pass there was produced 24.6 per cent of 400° F. end point gasoline having an octane number of 79.2. There was also produced 5 per cent by volume of the original charge of readily polymerizable 3 and 4 carbon atom olefins.

EXAMPLE III

The procedure used in the present example was to precipitate and purify a silica gel, then suspending in a solution of an aluminum salt and subsequently drying the drained precipitate at approximately 300° F. The detailed description is given below.

390 cc. of concentrated hydrochloric acid in 1815 cc. of solution was added to 568.4 grams of sodium silicate ($Na_2SiO_3.9H_2O$) in 300 cc. of water which gave a liquid suspension which was definitely acidic to blue litmus. The filter cake was then slurried in 2½ liters of water and filtered, this washing treatment being repeated several times. The filter cake was slurried in 2½ liters of water after which ⅛ equivalent of hydrochloric acid in 50 cc. of water was added. The precipitate was filtered and this treatment again repeated. The filter cake was slurried in water and water washing treatment repeated 4 times when the wash water was practically free from alkali metal salts. The purified silica was then slurried in 40.24 grams of aluminum chloride hexa-hydrate dissolved in 400 cc. of water. The excess liquid was then drained by filtration and the filter cake dried at approximately 300° F. The dried material was then pressed and sized into 6-10 mesh particles and subsequently calcined at approximately 932° F.

Using the same Pennsylvania gas-oil as in Example II, a yield of 26.3 per cent by volume 400° F. end point gasoline was obtained in a once-through operation, the octane number of gasoline being 78.8. There was also produced 5.9 per cent by volume of the original charge of readily polymerizable 3 and 4 carbon atom olefins.

We claim as our invention:

1. A process for producing catalysts which comprises suspending silica hydrogel in an aluminum salt solution, adding a volatile basic precipitant to precipitate hydrated alumina, and drying the resultant silica-alumina composite.

2. A process for the manufacture of catalysts suitable for use in hydrocarbon conversion reactions, which comprises suspending a precipitated silica hydrogel substantially free from alkali metal ions in an aluminum salt solution, precipitating hydrated alumina by the addition of a volatile basic precipitant, and heating the mixed precipitates to remove a major portion of the water content.

3. A process for the manufacture of catalysts suitable for use in hydrocarbon conversion reactions, which comprises suspending a silica hydrogel substantially free from alkali metal ions in a solution of an aluminum salt, precipitating hydrated alumina in the presence of the suspended silica hydrogel by the addition of a volatile basic precipitant, heating the precipitated material to remove a major portion of the water content, forming particles of definite size and calcining above temperatures of about 800° F.

4. A process for the manufacture of catalysts suitable for use in hydrocarbon conversion reactions, which comprises precipitating a silica hydrogel from a solution of an alkali metal silicate by the acidification thereof, washing and treating said hydrogel to substantially remove all alkali metals therefrom, suspending the purified hydrogel in a solution of an aluminum salt and precipitating alumina by means of a volatile basic precipitant, heating the precipitated material to remove a major portion of the water content, forming particles of definite size and calcining above temperatures of about 800° F.

5. A process for the manufacture of catalysts suitable for use in hydrocarbon conversion reactions, which comprises precipitating a silica hydrogel from a solution of an alkali metal silicate by the acidification thereof, washing and treating said hydrogel with an acidic solution and water to substantially remove all alkali metals therefrom, suspending the purified hydrogel in a solution of an aluminum salt and precipitating alumina by means of a volatile basic precipitant, heating the precipitated material to remove a major portion of the water content, forming particles of definite size and calcining above temperatures of about 800° F.

6. A process for the manufacture of catalysts suitable for use in hydrocarbon conversion reactions, which comprises precipitating a silica hydrogel from a solution of an alkali metal silicate by the acidification thereof, washing and treating said hydrogel with a solution of an ammonium compound and water to substantially remove all alkali metals therefrom, suspending the purified hydrogel in a solution of an aluminum salt and precipitating alumina by means of a volatile basic precipitant, heating the precipitated material to remove a major portion of the water content, forming particles of definite size and calcining above temperatures of about 800° F.

7. A process for the manufacture of catalysts suitable for use in hydrocarbon conversion reactions, which comprises precipitating a silica hydrogel from a solution of an alkali metal silicate by the acidification thereof, washing and treating said hydrogel with a solution of a salt of multivalent metal and water to substantially remove all alkali metals therefrom, suspending the purified hydrogel in a solution of an aluminum salt and precipitating alumina by means of a volatile basic precipitant, heating the precipitated material to remove a major portion of the water content, forming particles of definite size and calcining above temperature of about 800° F.

8. A process for the manufacture of catalysts suitable for use in hydrocarbon conversion reactions, which comprises precipitating a silica hydrogel from a solution of an alkali metal silicate by the acidification thereof, washing and treating said hydrogel with a solution of an aluminum salt and water to substantially remove all alkali metals therefrom, suspending the purified hydrogel in a solution of an aluminum salt and precipitating alumina by means of a volatile basic precipitant, heating the precipitated material to remove a major portion of the water content, forming particles of definite size and calcining above temperatures of about 800° F.

CHARLES L. THOMAS.
JACOB ELSTON AHLBERG.